(12) United States Patent
Garcia

(10) Patent No.: US 10,969,138 B1
(45) Date of Patent: Apr. 6, 2021

(54) DRAIN PAN HANGER SYSTEM AND METHOD OF USE

(71) Applicant: Miguel Angel Garcia, Fort Worth, TX (US)

(72) Inventor: Miguel Angel Garcia, Fort Worth, TX (US)

(\*) Notice: Subject to any disclaimer, the term of this patent is extended or adjusted under 35 U.S.C. 154(b) by 55 days.

(21) Appl. No.: 16/401,345

(22) Filed: May 2, 2019

(51) Int. Cl.
*F24F 13/22* (2006.01)
*F16M 13/02* (2006.01)

(52) U.S. Cl.
CPC ............ *F24F 13/222* (2013.01); *F16M 13/02* (2013.01)

(58) Field of Classification Search
CPC .......... F24F 13/222; F24F 13/22; F24F 13/32; F16M 13/02; F16M 13/00; F16M 13/005; F16M 11/04; F25D 21/14; F25D 21/00; E03C 1/32
See application file for complete search history.

(56) References Cited

U.S. PATENT DOCUMENTS

| 1,684,558 A | * | 9/1928 | Schwarz | F25D 21/14 62/288 |
| 2018/0010844 A1 | * | 1/2018 | Booz | F24F 13/222 |

\* cited by examiner

*Primary Examiner* — Emmanuel E Duke
(74) *Attorney, Agent, or Firm* — Richard Eldredge; Leavitt Eldredge Law Firm

(57) ABSTRACT

A combination drain pan and hanger system, the combination includes a drain pan having a bottom surface; a hanger to support the drain pan under an appliance, the hanger having a support; a bracket to secure to a bottom surface of the appliance; the support is to rest under the drain pan such that the drain pan is positioned under the appliance to catch any water.

3 Claims, 5 Drawing Sheets

DRAIN PAN HANGER SYSTEM AND METHOD OF USE

BACKGROUND

1. Field of the Invention

The present invention relates generally to drain pan systems, and more specifically, to a drain pan hanger system for suspending a drain pan below an appliance for convenient moisture catching and retention.

2. Description of Related Art

Drain pan systems are well known in the art and are effective means to catch moisture from one or more appliances, such as HVAC systems. For example, FIG. 1 depicts a conventional system 101 having an appliance 103 over the top of a drain pan 105 with a drainage pipe 107. During use, any moisture that is released from appliance 103 falls into pan 105 and can be drained from pipe 107.

One of the problems commonly associated with system 101 is limited use. For example, not all moisture will drain from pan 105 due to the pipe 107 being attached at a side of the pan as opposed to a bottom of the pan.

Accordingly, although great strides have been made in the area of drain pan systems, many shortcomings remain.

DESCRIPTION OF THE DRAWINGS

The novel features believed characteristic of the embodiments of the present application are set forth in the appended claims. However, the embodiments themselves, as well as a preferred mode of use, and further objectives and advantages thereof, will best be understood by reference to the following detailed description when read in conjunction with the accompanying drawings, wherein:

Figure 1:
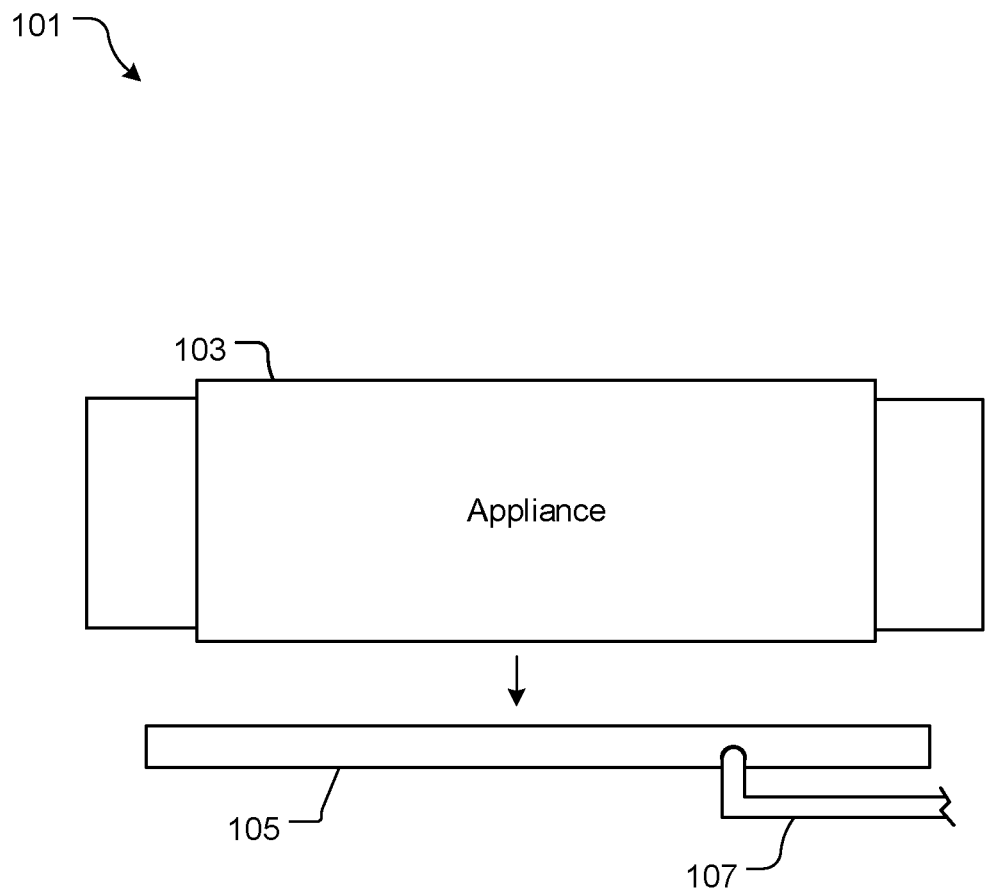
FIG. 1 is a simplified side view of a common drain pan system.

While the system and method of use of the present application is susceptible to various modifications and alternative forms, specific embodiments thereof have been shown by way of example in the drawings and are herein described in detail. It should be understood, however, that the description herein of specific embodiments is not intended to limit the invention to the particular embodiment disclosed, but on the contrary, the intention is to cover all modifications, equivalents, and alternatives falling within the spirit and scope of the present application as defined by the appended claims.

DETAILED DESCRIPTION OF THE PREFERRED EMBODIMENT

Illustrative embodiments of the system and method of use of the present application are provided below. It will of course be appreciated that in the development of any actual embodiment, numerous implementation-specific decisions will be made to achieve the developer's specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

The system and method of use in accordance with the present application overcomes one or more of the above-discussed problems commonly associated with conventional drain pan systems. Specifically, the present invention provides for a drain pan hanger system that allows for the drain pan to be suspended from the appliance to allow for convenient draining. These and other unique features of the system and method of use are discussed below and illustrated in the accompanying drawings.

The system and method of use will be understood, both as to its structure and operation, from the accompanying drawings, taken in conjunction with the accompanying description. Several embodiments of the system are presented herein. It should be understood that various components, parts, and features of the different embodiments may be combined together and/or interchanged with one another, all of which are within the scope of the present application, even though not all variations and particular embodiments are shown in the drawings. It should also be understood that the mixing and matching of features, elements, and/or functions between various embodiments is expressly contemplated herein so that one of ordinary skill in the art would appreciate from this disclosure that the features, elements, and/or functions of one embodiment may be incorporated into another embodiment as appropriate, unless described otherwise.

The preferred embodiment herein described is not intended to be exhaustive or to limit the invention to the precise form disclosed. It is chosen and described to explain the principles of the invention and its application and practical use to enable others skilled in the art to follow its teachings.

Figure 2A:
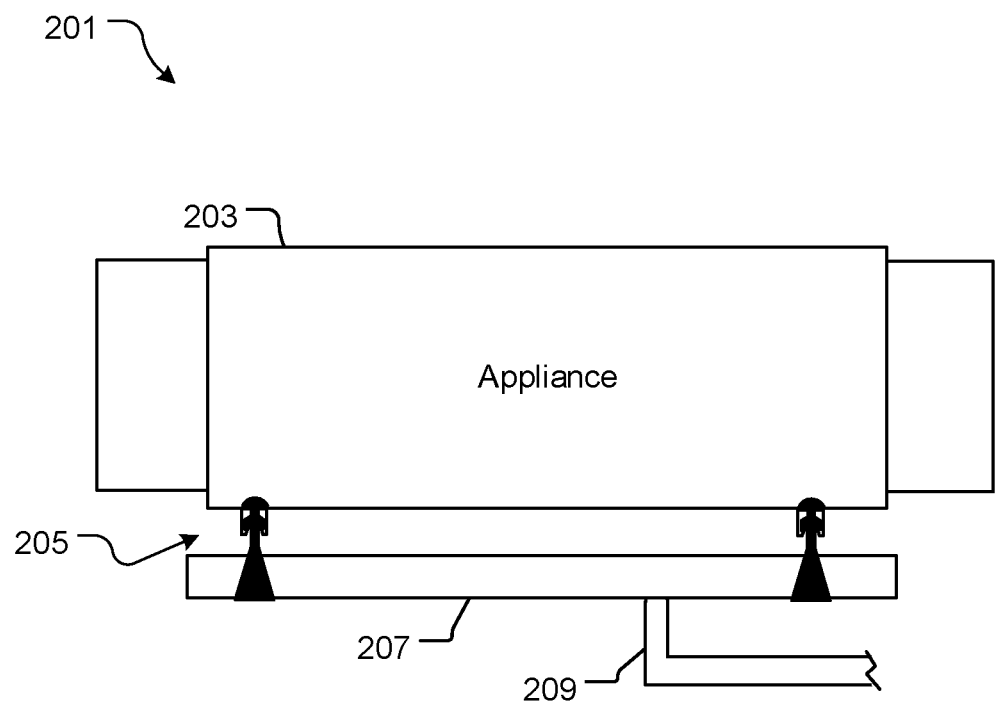
FIG. 2A is a front view of a drain pan hanger system in accordance with a preferred embodiment of the present invention.
Figure 2B:
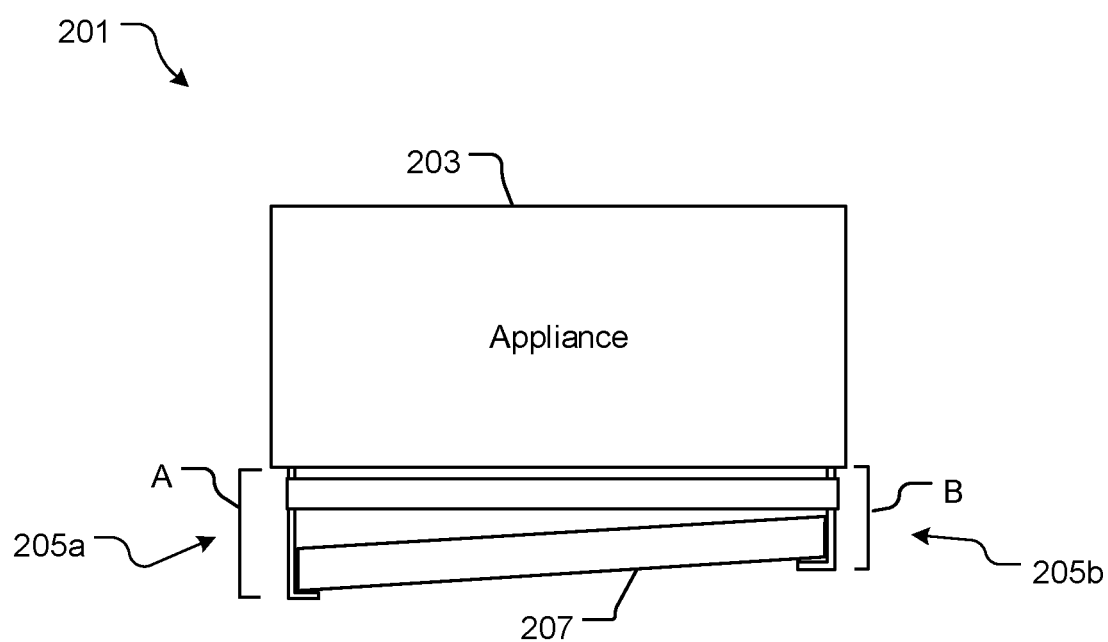
FIG. 2B is a side view of the drain pan hanger system of FIG. 2A.

Referring now to the drawings wherein like reference characters identify corresponding or similar elements throughout the several views, FIGS. 2A and 2B depict front and side views of a drain pan hanger system in accordance with a preferred embodiment of the present application. It will be appreciated that system 201 overcomes one or more of the above-listed problems commonly associated with conventional drain pan systems.

In the contemplated embodiment, system 201 includes an appliance 203, which can include any appliance that a user desires to catch moisture underneath, including an HVAC system a water heater or the like. System 201 further includes a hanger system 205 configured to suspend a drain pan 207 underneath the appliance 203. In some embodiments, one or more pipes 209 can be in fluid communication with the drain pan and configured to drain the moisture collected in the pan. As shown in FIG. 2B, the drain pan 207 is secured at an angle, wherein a first hanger system 205a is longer than a second hanger system 205b. In one preferred embodiment, length A is 6 inches while length B is 5 inches.

This allows for improved drainage of the system.

It should be appreciated that one of the unique features believed characteristic of the present application is the hanger system which provides for a convenient means to secure the drain pan underneath the appliance to catch moisture.

Figure 3:
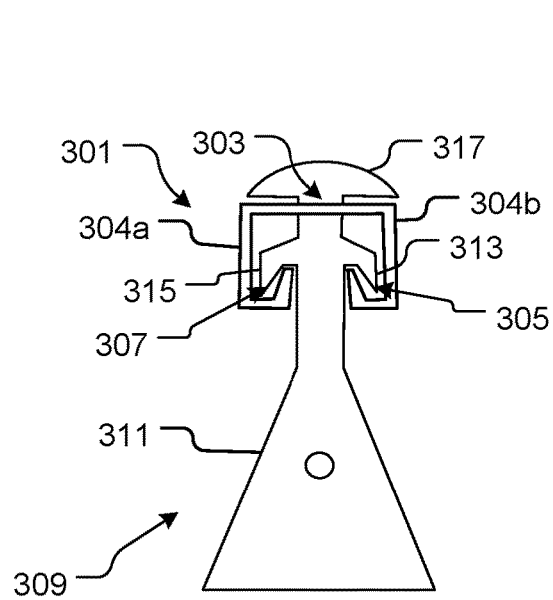
FIG. 3 is a front view of a hanger system of FIG. 2A.

In FIG. 3, a side view depicts a preferred embodiment of hanger system 205. Hanger system 205 including a bracket 301 with a top surface 303 configured to secure to a bottom of appliance 203 and extending between first and second sides 304a-b. Bracket 301 includes a first and second channel 305, 307 and includes one or more holes 501 configured to receive a securement device such as a bolt or screw. Hanger system 205 further includes a support 309 with a body 311 to extend from the bracket 301 and engage with the drain pan 207. In this embodiment, support 309 includes a first lip 313 and a second lip 315 configured to engage with the channels 305, 307. In addition, a top cap 317 is configured to extend through one of the boles to secure the support in place.

Figure 4:
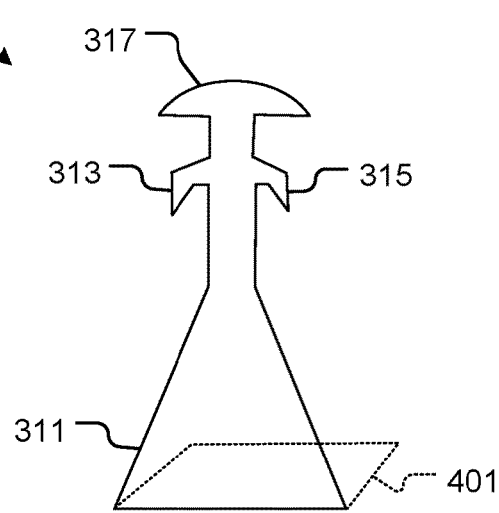
FIG. 4 is a side view of a support of FIG. 3.
Figure 5:
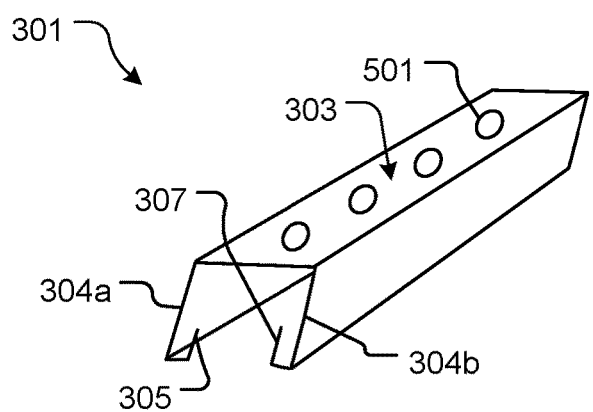
FIG. 5 is an oblique view of a bracket of FIG. 3.

In FIGS. 4 and 5, the bracket 301 and support 309 are shown for more clarity. Support 309 including a platform 401 to secure underneath the drain pan to hold the drain pan suspended.

Figure 6:
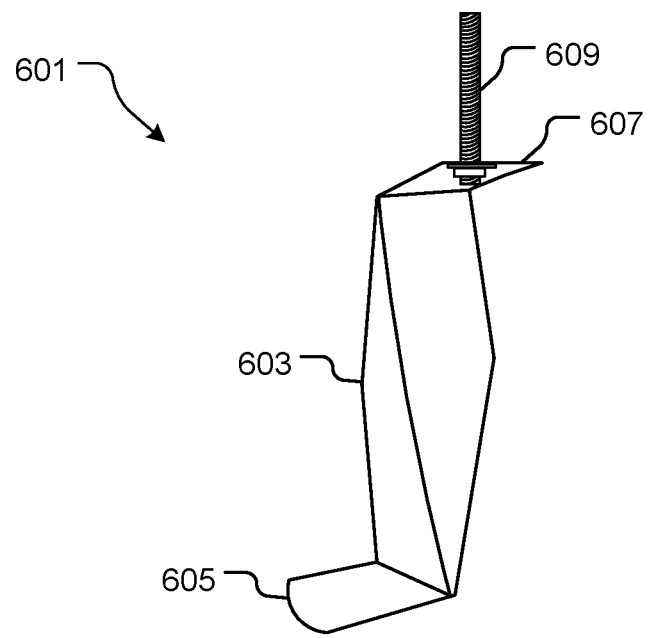
FIG. 6 is an oblique view of a hanger system in accordance with an alternative embodiment of the present application.

In FIG. 6, an alternative embodiment of a hanger system 601 is shown including a body 603 extending between a platform 605 and a top bracket 607, wherein the top bracket 607 is positioned to point in an opposite direction from platform 605. In this embodiment, top bracket 607 includes a securement device 609, such as a bolt, to secure to the appliance.

Figure 7:
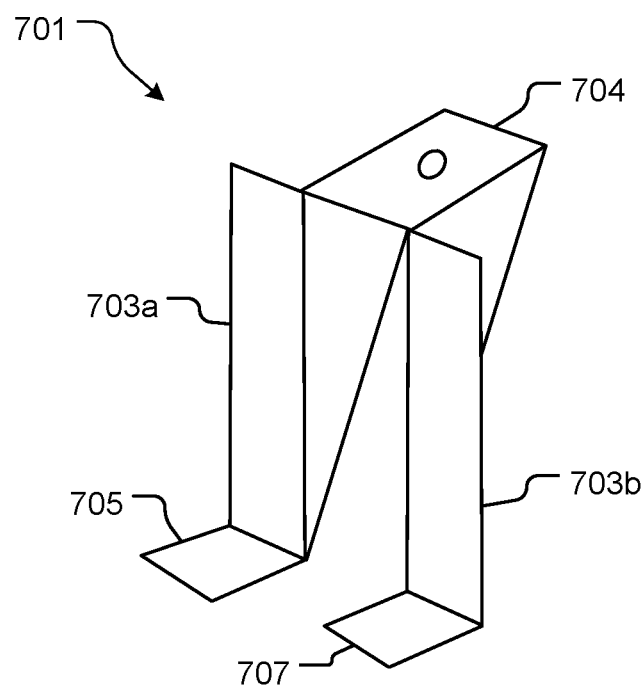
FIG. 7 is an oblique view of a hanger system in accordance with another alternative embodiment of the present application.

In FIG. 7, yet another alternative embodiment of a hanger system 701 is shown having a body 703 extending from a top bracket 704 to double platforms 705, 707. This embodiment further provides for securing to the appliance and providing the platforms 705, 707 for holding the drain pan.

It should be appreciated that other alternative embodiments could be contemplated and configured to suspend the drain pan from the appliance.

Figure 8:
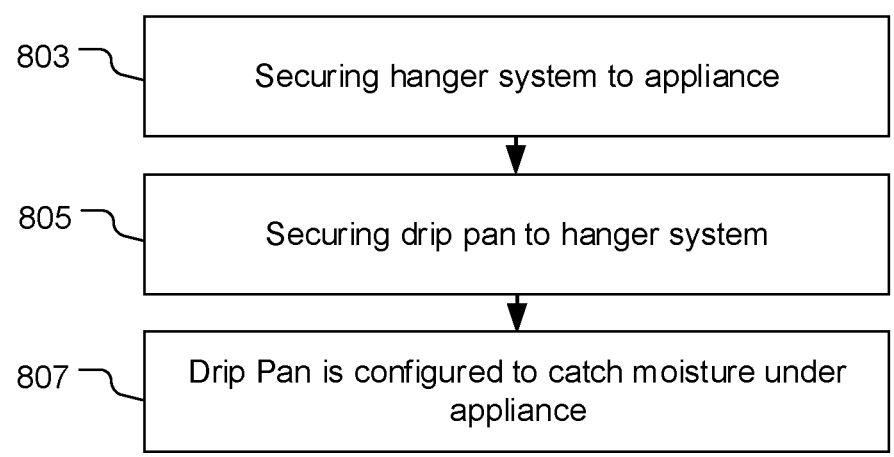
FIG. 8 is a flowchart of a method of use of the system of FIG. 2A.

In FIG. 8, a flowchart 801 depicts a method of use of system 201. During use, the hanger system is secured to the appliance such that the support extends downward and the one or more platforms are configured to receive and hold the drain pan under the appliance, as shown with boxes 803, 805. This allows for the drain pan to catch moisture expelled from the appliance, as shown with box 807.

The particular embodiments disclosed above are illustrative only, as the embodiments may be modified and practiced in different but equivalent manners apparent to those skilled in the art having the benefit of the teachings herein. It is therefore evident that the particular embodiments disclosed above may be altered or modified, and all such variations are considered within the scope and spirit of the application. Accordingly, the protection sought herein is as set forth in the description. Although the present embodiments are shown above, they are not limited to just these embodiments, but are amenable to various changes and modifications without departing from the spirit thereof.

What is claimed is:

1. A drain pan system, comprising:
    a hanger system configured to support a drain pan under an appliance, the hanger system having:
    a bracket configured to secure to a bottom surface of the appliance, the bracket having a first channel and a second channel;
    a support configured to removably engage with the bracket and configured to secure the drain pan in a fixed position under the appliance, the support having:
        an elongated body extending from a first end to a second end, the second end is configured to engage with the drain pan;
        the first end having a first lip configured to releasably engage with the first channel and a second lip configured to releasably engage with the second channel;
    wherein the support is configured to rest under the drain pan such that the drain pan is positioned under the appliance to catch any water.

2. The system of claim 1, wherein the bracket further comprises:
    a top surface having one or more holes to secure to the bottom surface of the appliance.

3. The system of claim 1, wherein the support and the bracket are attached via a vertical body.

* * * * *